United States Patent
Bucher et al.

(10) Patent No.: US 11,029,019 B1
(45) Date of Patent: Jun. 8, 2021

(54) CEILING FAN LIGHT AND FAN CONTROL SYSTEMS AND METHODS

(71) Applicant: CHIEN LUEN INDUSTRIES CO., LTD., INC., Oakland Park, FL (US)

(72) Inventors: Charles E. Bucher, Tampa, FL (US); Zachary Zauhar, Oakland Park, FL (US)

(73) Assignee: CHIEN LUEN INDUSTRIES CO., LTD., INC., Oakland Park, FL (US)

( * ) Notice: Subject to any disclaimer, the term of this patent is extended or adjusted under 35 U.S.C. 154(b) by 0 days.

(21) Appl. No.: 16/894,272

(22) Filed: Jun. 5, 2020

(51) Int. Cl.
| | |
|---|---|
| *F04D 25/08* | (2006.01) |
| *F21V 33/00* | (2006.01) |
| *H02P 6/08* | (2016.01) |
| *F21V 23/04* | (2006.01) |
| *H05B 47/19* | (2020.01) |

(52) U.S. Cl.
CPC ........ *F21V 33/0096* (2013.01); *F04D 25/088* (2013.01); *F21V 23/0435* (2013.01); *H02P 6/08* (2013.01); *H05B 47/19* (2020.01)

(58) Field of Classification Search
CPC .. F21V 33/0096; H05B 47/175; F04D 25/088
See application file for complete search history.

(56) References Cited

U.S. PATENT DOCUMENTS

| | | | |
|---|---|---|---|
| 4,621,992 A | 11/1986 | Angott | |
| 4,719,446 A | 1/1988 | Hart | |
| 5,041,825 A | 8/1991 | Hart et al. | |
| 6,036,331 A * | 3/2000 | Acquisto | F04D 29/005 362/96 |
| 10,568,187 B1 | 2/2020 | Bucher et al. | |
| 10,756,662 B2 * | 8/2020 | Steiner | H04B 3/54 |
| 10,865,981 B1 * | 12/2020 | Petrollini | F21V 23/0435 |
| 10,897,806 B1 | 1/2021 | Bucher et al. | |
| 2010/0308657 A1 | 12/2010 | Bucher | |

* cited by examiner

*Primary Examiner* — Robert J May
(74) *Attorney, Agent, or Firm* — Brian S. Steinberger; Hilary F. Steinberger; Law Offices of Brian S. Steinberger, P.A.

(57) ABSTRACT

Systems, devices, and methods for ceiling fan remote controls that allows the wall switches, pull chains and remote control transmitters to both separately and independently control the ceiling fan lights and fan. Systems, device and methods for over-riding a ceiling fan remote control so that a single wall switch can activate the ceiling fan light(s) if the remote control transmitter is not available. Systems, devices, and methods for ceiling fan remote controls that allows the wall switches, pull chains, and remote controls to both separately and independently control the ceiling fan lights and the fan. Systems, devices and methods for ceiling fan remote control receivers that can be connected to two separate wall switches that allows a ceiling fan remote control system that allows for both the wall switch and remote transmitter to each control the light.

17 Claims, 8 Drawing Sheets

CEILING FAN LIGHT AND FAN CONTROL SYSTEMS AND METHODS

FIELD OF INVENTION

This invention relates to ceiling fan light and fan controls, and in particular to systems, devices, and methods for ceiling fan remote controls that allows the wall switches and remotes to both separately and independently control the ceiling fan lights and fan.

BACKGROUND AND PRIOR ART

A problem with conventional ceiling fan remote controls is the light kit can only be controlled with the remote control transmitter. Once you turn the light off using the remote control transmitter, when you come back into the room, you have to find the remote control transmitter to turn the light back on. When the room is dark, such as nightime, it can be a significant nuisance to have to blindly search for the remote control transmitter. If the remote control transmitter is misplaced, it can be even more frustrating.

Examples of prior art ceiling fans with remote controls include U.S. Pat. No. 4,719,446 to Hart; U.S. Pat. No. 4,621,992 to Angott; and U.S. Pat. No. 5,041,825 to Hart et al., which are all incorporated by reference in their entirety.

Most conventional ceiling fan remote controls are only powered by a single power source from a single wall switch. This was great in older homes that only had a single wall switch in a room for an overhead light.

However, newer homes typically have two wall switches in a room, one for an overhead light and another for a ceiling fan. This two switch configuration is good for a manually (pull chain) controlled ceiling fan with light. One switch powers the ceiling fan and the other switch powers the light. The customer can control the fan and light independently from the two switches.

However, as previously mentioned, conventional remote controls are only connected to one of the wall switches and the customer uses the remote control transmitter to send signals to the remote control receiver to operate the ceiling fan and the light. Thus, if the customer has the two switch configuration, he/she loses the functionality of the other switch.

FIG. 1 is a prior art schematic 1 of a standard ceiling fan 50 installed with no remote control. FIG. 1 shows the how a typical ceiling fan 50 is connected to single wall switch 10. The light 60 and fan motor 50 wires 43 and 42 respectively are connected together to the 120 VAC line wire 22 coming from the single wall switch 10. The 120 VAC neutral wire 21 is connected to the ceiling fan motor and light neutral wire 41 as shown connected in the junction box 30. The fan motor 50 and light 60 can be operated from the single wall switch 10. The wires are typically connected together in the junction box 30 using wire nuts and covered by the ceiling fan canopy 40.

When energized, the single wall switch 10 provides power to the combination ceiling fan motor 50 and light assembly 60. In order to operate the fan motor 50 and light 60 independently, the customer must manually control the fan and light using the pull chains 55 and 56 on the ceiling fan.

FIG. 2 is a prior art schematic 100 of a ceiling fan installed with a single wall switch 110, connected to a remote control receiver 170 and controllable by a remote control transmitter 115. FIG. 2 shows a typical Prior Art ceiling fan remote control receiver 170 connected to a single wall switch 110 The input line wire 132 of the remote control receiver 170 is connected to the 120 VAC line wire 122 coming from the single wall switch 110 and connected in the junction box 130. The input neutral wire 131 of the remote control receiver is connect to the 120 VAC neutral wire 121 as shown connected in the junction box 130. The output of the remote control receiver ceiling fan motor line wire 172 is connected to the ceiling fan motor line wire 142.

The output of the remote control receiver light line wire 173 is connected to the ceiling fan light line wire 143. The output of the remote control receiver neutral wire 171 is connected to the ceiling fan motor and light neutral wire 141. When energized, the single wall switch 110 configuration provides power to the combination ceiling fan motor 150 and light assembly 160. In order to operate the fan motor 150 and light 160 independently, the customer must control the fan and light individually using the remote control transmitter 115 and/or the pull chains 155 and 156 on the ceiling fan.

Thus, there is a need for a ceiling fan remote control receiver that can be connected to two separate wall switches that allows a ceiling fan remote control system that allows for both the wall switch and remote transmitter to each control the light.

SUMMARY OF THE INVENTION

A first objective of the present invention is to provide systems, devices and methods for controlling a ceiling fan remote control system so that a single wall switch can activate the ceiling fan light(s) if the remote control transmitter is not available.

A second objective of the present invention is to provide systems, devices, and methods for ceiling fan remote control systems that allows the wall switches to both separately and independently control the ceiling fan lights and fan.

A third objective of the present invention is to provide systems, devices, and methods for ceiling fan remote control systems that allows the wall switches and remote control transmitters to both separately and independently control the ceiling fan lights and fan.

A fourth objective of the present invention is to provide systems, devices and methods for ceiling fan remote control receivers that can be connected to two separate wall switches that allows a ceiling fan remote control system that allows for both the wall switch and remote control transmitter to each control the light.

A fifth objective of the present invention is to provide systems, devices and methods for ceiling fan remote control receivers that can be connected to two separate wall switches that allows a ceiling fan remote control system that allows for both the wall switches and remote control transmitter to each control the light and the fan.

A remote control receiver typically has an internal memory and remembers the last state of the ceiling fan and light kit when the power is turned off at the wall switch. When the power is restored at the wall switch it will resume operation in the previous state. For example, if the fan is set on medium speed and the light kit is on, it will remember that condition when the wall switch is turned off and then resume that condition when the wall switch is turned on.

Thus, if the light is turned off and the customer turns off the wall switch when leaving the room and then returns to the room and turns the wall switch on, the light will still be off for conventional remote controls.

With the new remote control system that can be connected to two separate wall switches, the light can be independently controlled with the wall light switch. For example, if the light wall switch is turned off and the light on the fan is off and then the light wall switch is turned on, the light will come on. This would be impossible with a conventional remote control system.

Additionally, if the fan wall switch is off and the fan is off and then the fan wall switch is turned on, the fan will come on to its previous on setting (for example, high, medium or low—whichever it was last set on prior to turning off).

A preferred embodiment can include a system of controlling a ceiling fan remote control system, comprising: a ceiling fan having a remote control for controlling light to the ceiling fan, and a wall switch having an on and an off state, wherein the wall switch control will operate the ceiling fan light with or without the remote control.

In this system with the wall switch in an off position, and the light is off, then switching the wall switch on will turn on the light.

In this system with the wall switch in an on position, and the light is on, then switching the wall switch off will turn off the light.

In this system with the wall switch wherein with the wall switch in an on position, and the light is off, then toggling for switching the wall switch off and on will turn on the light.

In this system, wherein toggling can includes up to approximately 10 seconds between turning the switch off and back on.

Additional embodiments can include systems with a single wall switch for controlling power to both the light and the fan. Still further embodiments can include having a wall switch having a first switch for controlling power to the light and a second switch for controlling power to the fan.

Embodiments can allow for both the wall switch and the remote control to each be able to turn on and turn off power to the light and fan, independently and/or in combination with one another.

The embodiments allow for the wall switch or wall switches to over-ride operating the remote control for operating the ceiling light and/or ceiling fan.

The wall switch or wall switches can be used to run power to the ceiling fan light and/or ceiling fan with or without the remote control transmitter that can be used for operating the ceiling fan light and/or the ceiling fan. The embodiments can include operations that allow the user to use a toggling action with the wall switch or wall switches to turn on the ceiling fan light and/or ceiling fan without using the remote control, wherein toggling can includes up to approximately 10 seconds between turning the switch off and back on.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1:
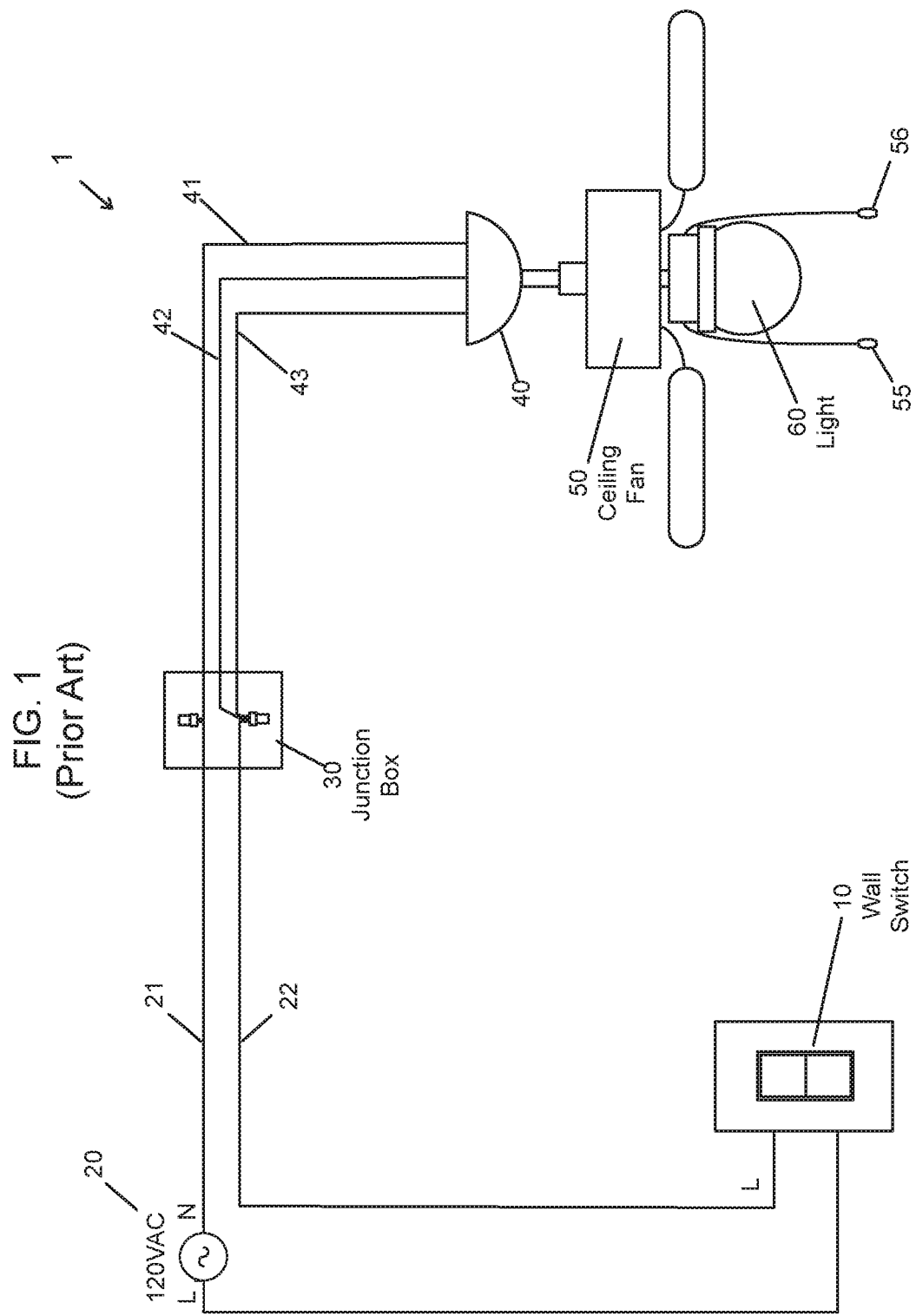
FIG. 1 is a prior art schematic of a standard ceiling fan installed with no remote control.
Figure 2:
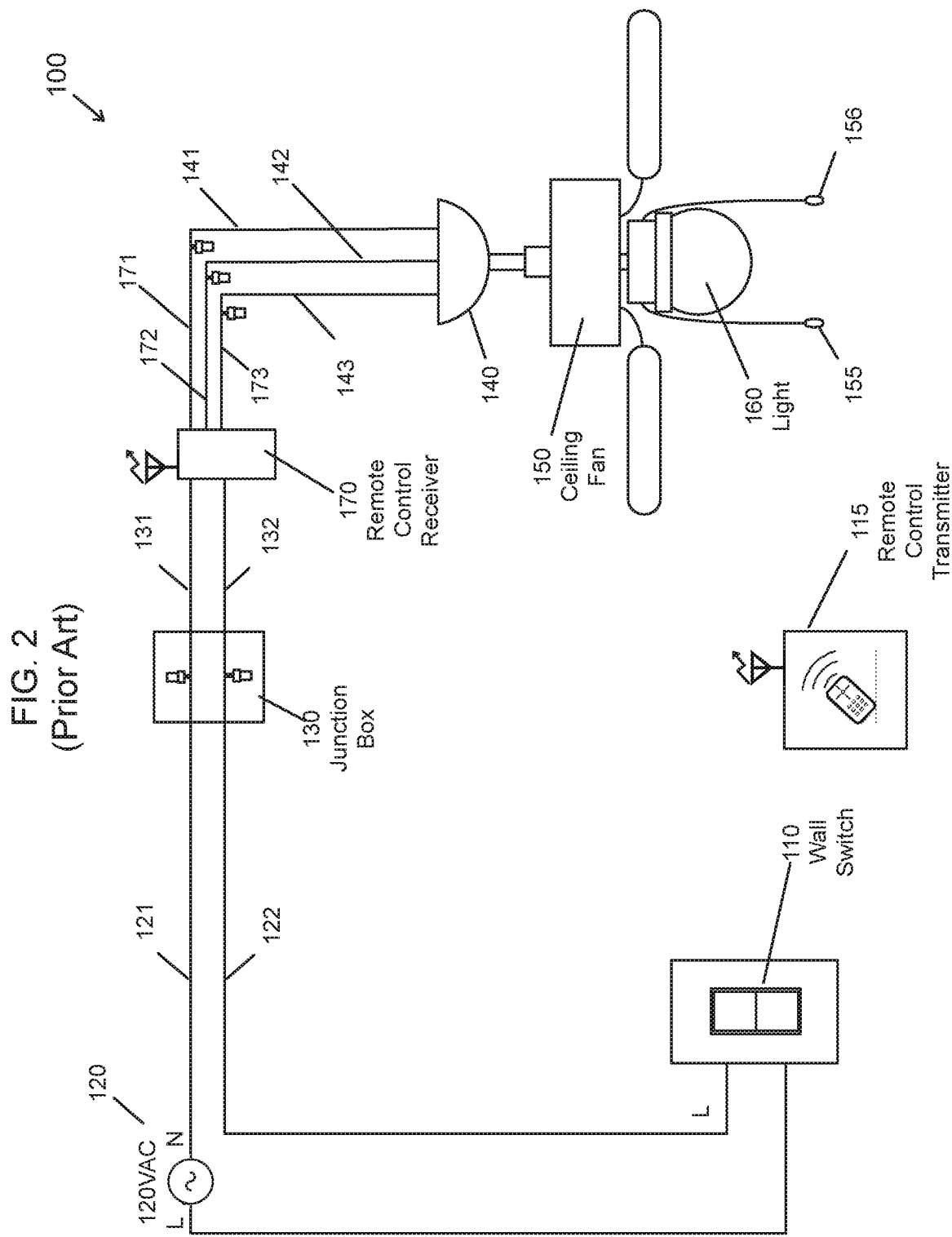
FIG. 2 is a prior art schematic of a ceiling fan installed with a single wall switch connected to a conventional remote control receiver and external remote control transmitter for controlling the ceiling fan and light.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figure 3:
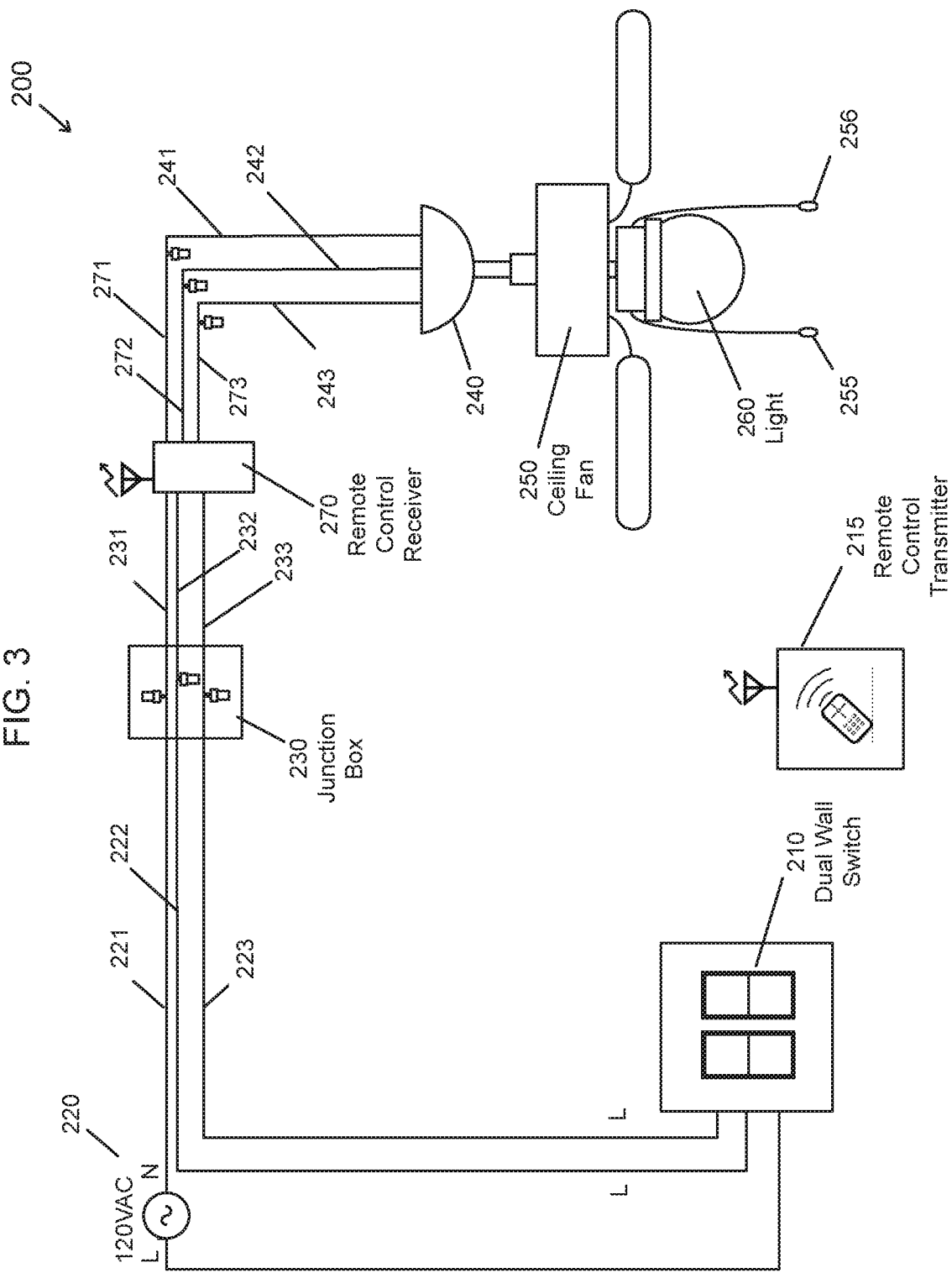
FIG. 3 is a schematic of the ceiling fan installed with two wall switches, connected to the novel remote control receiver and external remote control transmitter for controlling the ceiling fan and light.

A list of components will now be described.
1 single wall switch control for ceiling fan and no remote control (prior art)
10 wall switch
20 power supply (120 VAC)
21 neutral wire
22 wall switch line wire
30 junction box
40 ceiling fan canopy
41 ceiling fan motor and light neutral wire
42 fan motor line wire
43 light line wire
50 fan motor
55 fan pull chain
56 light pull chain
60 an overhead light
100 single wall switch control for ceiling fan & light and remote. (prior art)
110 wall switch
115 remote control transmitter
120 power supply (120 VAC)
121 neutral wire
122 wall switch line wire
130 junction box
131 remote control receiver input neutral wire
132 remote control receiver input line wire
140 ceiling fan canopy
141 ceiling fan motor and light neutral wire
142 ceiling fan motor line wire
143 ceiling fan light line wire
150 fan motor
155 pull chains
160 overhead light
170 remote control receiver
171 remote control receiver output neutral wire
172 remote control receiver output motor line wire
173 remote control receiver output light line wire
200 two wall switches for controlling ceiling fan and remote control
210 dual wall switch
215 remote control transmitter
220 power supply (120 VAC)
221 neutral wire
222 fan motor wall switch line wire
223 light wall switch line wire
230 junction box
231 remote control receiver input neutral wire
232 remote control receiver input fan motor line wire
233 remote control receiver input light line wire
240 ceiling fan canopy
241 ceiling fan motor and light neutral wire
242 ceiling fan motor line wire
243 ceiling fan light line wire
250 fan motor
260 overhead light
270 remote control receiver
271 remote control receiver output neutral wire
272 remote control receiver output motor line wire
273 remote control receiver output light line wire
300 single wall switch control for ceiling fan and remote control (two wires)
310 wall switch
315 remote transmitter
320 power supply (120 VAC)
321 neutral wire
322 wall switch line wire
330 junction box
331 remote control receiver input neutral wire
332 remote control receiver input fan motor line wire
333 remote control receiver input light line wire
340 canopy
341 ceiling fan motor and light neutral wire
342 ceiling fan motor line wire
343 ceiling fan light line wire
350 Fan motor
360 overhead light
370 remote control receiver
371 remote control receiver output neutral wire
372 remote control receiver output motor line wire
373 remote control receiver output light line wire
400 two wall switches controlling ceiling fan and remote control first embodiment
410 dual wall switch (two switches)
412 fan wall switch line voltage wire
414 light wall switch line voltage wire
415 remote transmitter
420 power supply (120 VAC)
421 120 VAC neutral wire
425 DC Power Supply
430 MCU
435 RF receiver module
442 Fan motor switch detection circuit
444 light switch detection circuit
450 fan motor
455 fan motor control
460 light
465 light control
470 remote control receiver
500 dual (two) wall switches controlling ceiling fan and remote control second embodiment
510 dual wall switch (two switches)
515 remote transmitter
520 power supply (120 VAC)
525 DC Power Supply
530 MCU
535 RF receiver module
542 Fan motor switch detection circuit
544 light switch detection circuit
550 fan motor
555 fan motor control
560 light
565 light control
580 relay switch
590 relay switch
600 dual (two) wall switches controlling ceiling fan and remote control third embodiment
610 dual wall switch (two switches)
615 remote transmitter
620 power supply (120 VAC)
625 DC Power Supply
630 MCU
635 RF receiver module
642 Fan motor switch detection
644 light switch detection
650 fan motor
655 fan motor control
660 light
665 light control
700 dual (two) wall switches controlling ceiling fan and remote control fourth embodiment 710 dual wall switch (two switches)
715 remote transmitter
720 power supply (120 VAC)
725 DC Power Supply
730 MCU
735 RF receiver module
742 Fan motor switch detection
744 light switch detection
750 brushless DC fan motor
755 fan motor control
760 light
765 light control FIG. 3 is a schematic 200 of a ceiling fan using the novel invention that is connected to a dual wall switch 210 circuit which provides power and control of the ceiling fan motor and light. FIG. 3 shows the novel ceiling fan remote control unit 270 connected to the dual wall switch 210 circuit. The novel remote control receiver 270 has 3 input wires (231, 232 and 233) as opposed to the typical 2 input wires. The input of the remote control receiver ceiling fan motor line wire 232 is connected to the 120 VAC line wire 222 coming from the ceiling fan motor control wall switch 210. The input of the remote control receiver ceiling fan light line wire 233 is connected to the 120 VAC line wire 223 coming from the ceiling fan light control wall switch 210. The input of the remote control receiver neutral wire 231 is connected to the 120 VAC neutral wire 221 as shown connected in the junction box 230. These wires can be connected together using wire nuts in the junction box and covered by the canopy 240. The output of the remote control receiver ceiling fan motor line 272 is connected to the ceiling fan motor line wire 242. The output of the remote control receiver light line wire 273 is connected to the ceiling fan light line wire 243.

The output of the remote control receiver neutral wire 271 is connected to the ceiling fan motor and light neutral wire 241. These wires can be connected together using wire nuts, pin and socket connectors or the like and covered by the canopy 240. The dual wall switch 210 configuration allows independent control of the ceiling fan motor and light.

When the ceiling fan motor control wall switch 210 is switched from an off state to an on state, the ceiling fan motor can turn on. In this case, it can remember the last state of the ceiling fan motor speed (such as high, medium or low) and power on to that fan speed. When the ceiling fan light control wall switch 210 is switched from an off state to an on state, the ceiling fan light can turn on. The customer may control the fan and light independently with the remote control transmitter 215.

Figure 4:
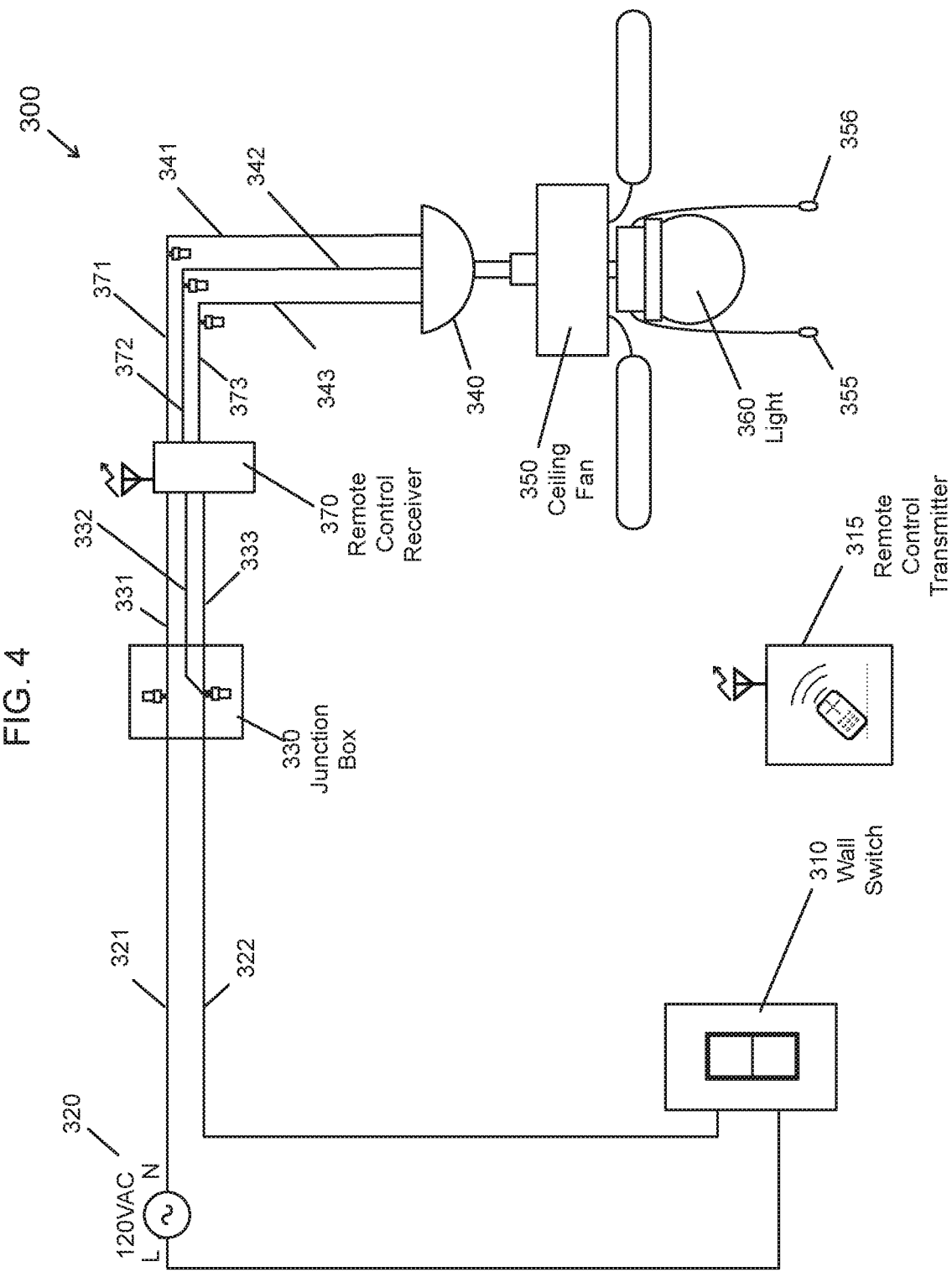
FIG. 4 is a schematic of the single wall switch control for the ceiling fan and novel remote control of the invention when installed in a single wall switch configuration.

FIG. 4 is a schematic 300 of the single wall switch control 310 for the ceiling fan 350 and remote control of the invention using two wires going into the junction box 330.

FIG. 4 shows how the novel ceiling fan remote control receiver 370 can be connected to a single wall switch 310 instead of a dual wall switch circuit as shown in FIG. 3.

In this configuration the input of the remote control receiver ceiling fan motor line wire 332 and ceiling fan light line wire 333 is connected to the 120 VAC line wire 322 coming from the single ceiling fan control wall switch 310.

The output of the novel remote control receiver wires are connected as described in FIG. 3 description above. Connecting the novel remote control receiver 370 in this configuration allows full compatibility with homes that only have a single wall switch 310. The single wall switch provides power to the remote control receiver 370, which provides power to the ceiling fan motor and light so it can function as a traditional remote control unit. When single wall switch 310 is switched from an off state to an on state, the ceiling fan motor and light can turn on. In this case, it can remember the last state of the ceiling fan motor speed (such as high, medium or low) and power on to that fan speed.

Just as described in FIG. 3, The customer may control the fan and light independently with the remote control transmitter 315.

Figure 5:
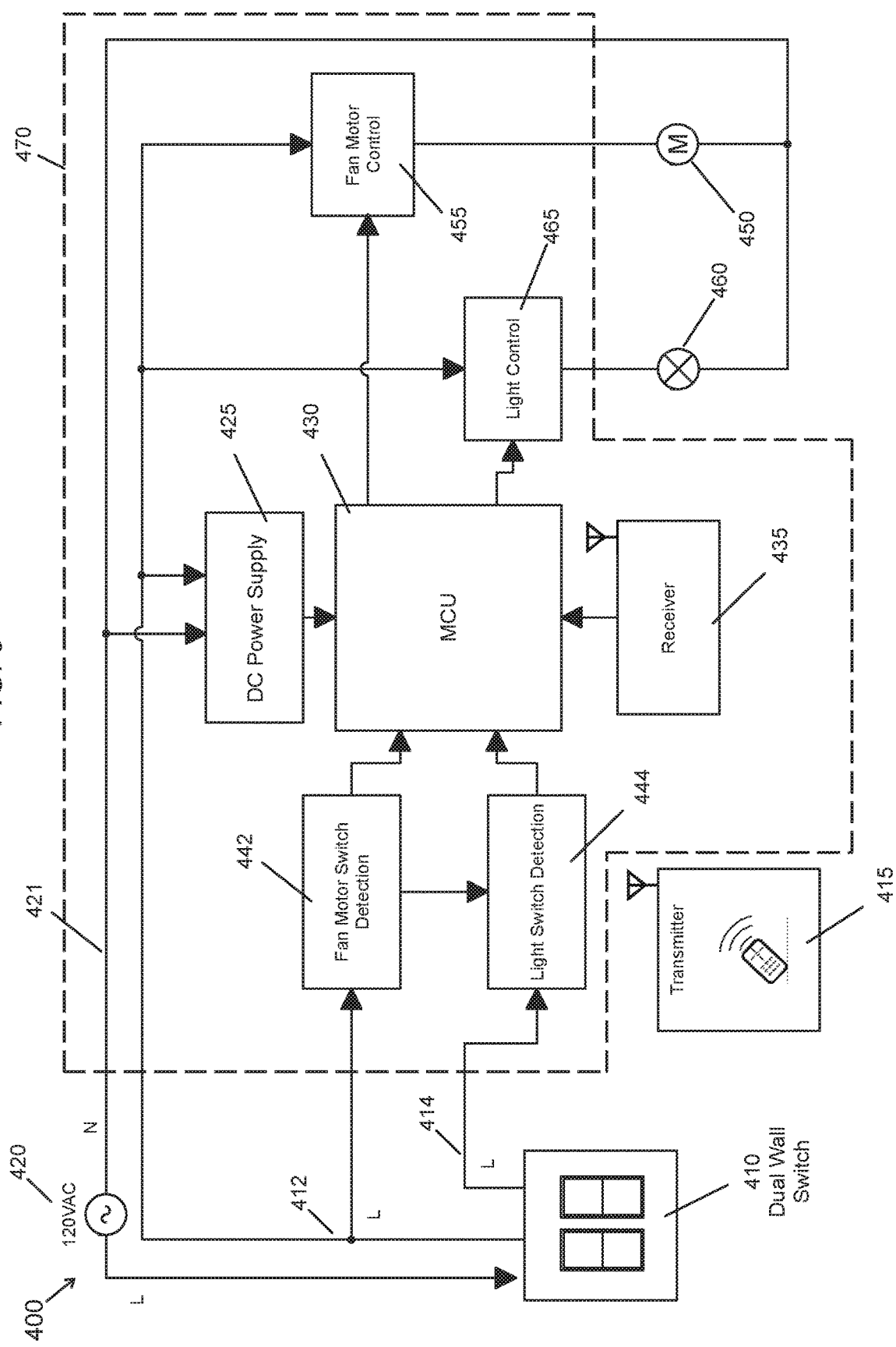
FIG. 5 is a first embodiment schematic of the two wall switches controlling the ceiling fan and remote control of the invention where the fan switch provides power to the ceiling fan and light kit and must be powered on for them to operate.

FIG. 5 is a schematic 400 of a first embodiment of this invention connected to a dual wall switch 410 circuit.

It's operation is as follows.

The 120 VAC line voltage 420 from ceiling fan motor wall switch 412 and its neutral wire 421 is connected to the DC power supply 425 of the remote control receiver 435. the DC power supply 425 converts the 120 VAC to a low voltage DC voltage that the MCU 430 and other components on the circuit board require.

The 120 VAC line voltages from ceiling fan motor wall switch 412 and light wall switch 414 are connected to the fan switch detection 442 and light switch detection 444 circuits respectively in the remote control receiver 470.

The MCU 430 monitors the switch detection circuits 442 and 444 and outputs a signal to control the ceiling fan motor 450 through the fan control circuit 455 and the light 460 through the light control circuit 465.

The fan control circuit 455 can turn the fan motor 450 on and off and can cause the fan to operate at varying speeds, for example low, medium, and high rpms.

The light control circuit 465 can turn the light 460 on and off and can cause the light 460 to dim in brightness from a fully on light output to a lower light output.

The MCU 430 is connected to a rf module 435 circuit that can receive a radio frequency signal from an external transmitter allowing the MCU 450 to control various function of the remote control such as fan on and off and multiple fan speeds, light on and off and various brightness's.

The light switch detection circuit 444 allows the MCU 430 to control the light according to the operation as defined in table 1 below.

Table 1 shows the Operation of the Light when installed in a dual wall switch configuration that can be used with FIG. 5. as described below.

TABLE 1

Control of light using the wall switch
when installed in a two wall switch configuration

| State of Light Wall Switch | State of Light Before Action | Action of Light Wall Switch | State of Light After Action |
|---|---|---|---|
| Off | Off | Turn On | On |
| On | On | Turn Off | Off |
| On | Off | Turn Off and Turn On | On |

Referring to TABLE 1 with the wall switch in an off position, and the light is off, then switching the wall switch on will turn on the light.

With the wall switch in an on position, and the light is on, then switching the wall switch off will turn off the light.

With the wall switch in an on position, and the light is off, then switching the wall switch off and on will turn on the light. This toggling of the wall switch can work up to approximately 10 seconds between turning the switch off and back on.

Referring to FIG. 5, the fan switch detection circuit 442 allows the MCU 430 to control the fan according to the operation as defined in table 2 below.

Table 2 shows the operation of the fan when installed in a dual switch configuration.

TABLE 2

Operation of the Fan when installed in a dual wall switch configuration: Control of fan using the wall switch when installed in a two wall switch configuration

| State of Fan Wall Switch | State of Fan Before Action | Action of Fan Wall Switch | State of Fan After Action |
|---|---|---|---|
| Off | Off | Turn On | On (Speed Set to Last Saved Speed) |
| On | On | Turn Off | Off |
| On | Off | Turn Off and Turn On | On (Speed Set to Last Saved Speed) |

Referring to TABLE 2 with the wall switch in an off position, and the fan is off, then switching the wall switch on will turn on the fan to the last saved speed.

With the wall switch in an on position, and the fan is on, then switching the wall switch off will turn off the fan.

With the wall switch in an on position, and the fan is off, then switching the wall switch off and on will turn on the fan to the last saved speed. This toggling of the wall switch can work up to approximately 10 seconds between turning the switch off and back on.

In this embodiment, the ceiling fan motor wall switch 410 must be powered on for the remote control receiver 470 to provide power to the fan motor 450 and light 460. Thus, the customer would typically keep the fan motor wall switch powered on and then control the light and fan with the remote control transmitter 415 or optionally using the wall switch control according to tables 1 and 2.

If connected to a single wall switch 110 as shown in FIG. 4, the fan and light switch detection circuits 442 and 444 respectively allows the MCU 430 to control the light 460 and fan motor 450 according to the operation as defined in table 3.

TABLE 3 shows operation of the fan and light when installed in a single wall switch configuration.

TABLE 3

Operation of the Fan and Light when installed in a single wall switch configuration. Control of light and fan using the wall switch when installed in a single all switch configuration

| State of Wall Switch | State of Fan and Light Before Action | Action of Wall Switch | State of Fan and Light After Action |
|---|---|---|---|
| Off | Off | Turn On | Fan and Light Set to Last Saved Setting |
| On | On | Turn Off | Off |
| On | Off | Turn Off and Turn On | Light On and Fan Set to Last Saved Speed |

Referring to TABLE 3 with the wall switch in an off position, and the fan is off, then switching the wall switch on will turn on the fan to the last saved fan speed setting.

With the wall switch in an on position, and the fan is on, then switching the wall switch off will turn off the fan.

With the wall switch in an on position, and the fan is off, then switching the wall switch off and on will turn on the fan to the last saved fan speed setting. This toggling of the wall switch can work up to approximately 10 seconds between turning the switch off and back on.

Figure 6:
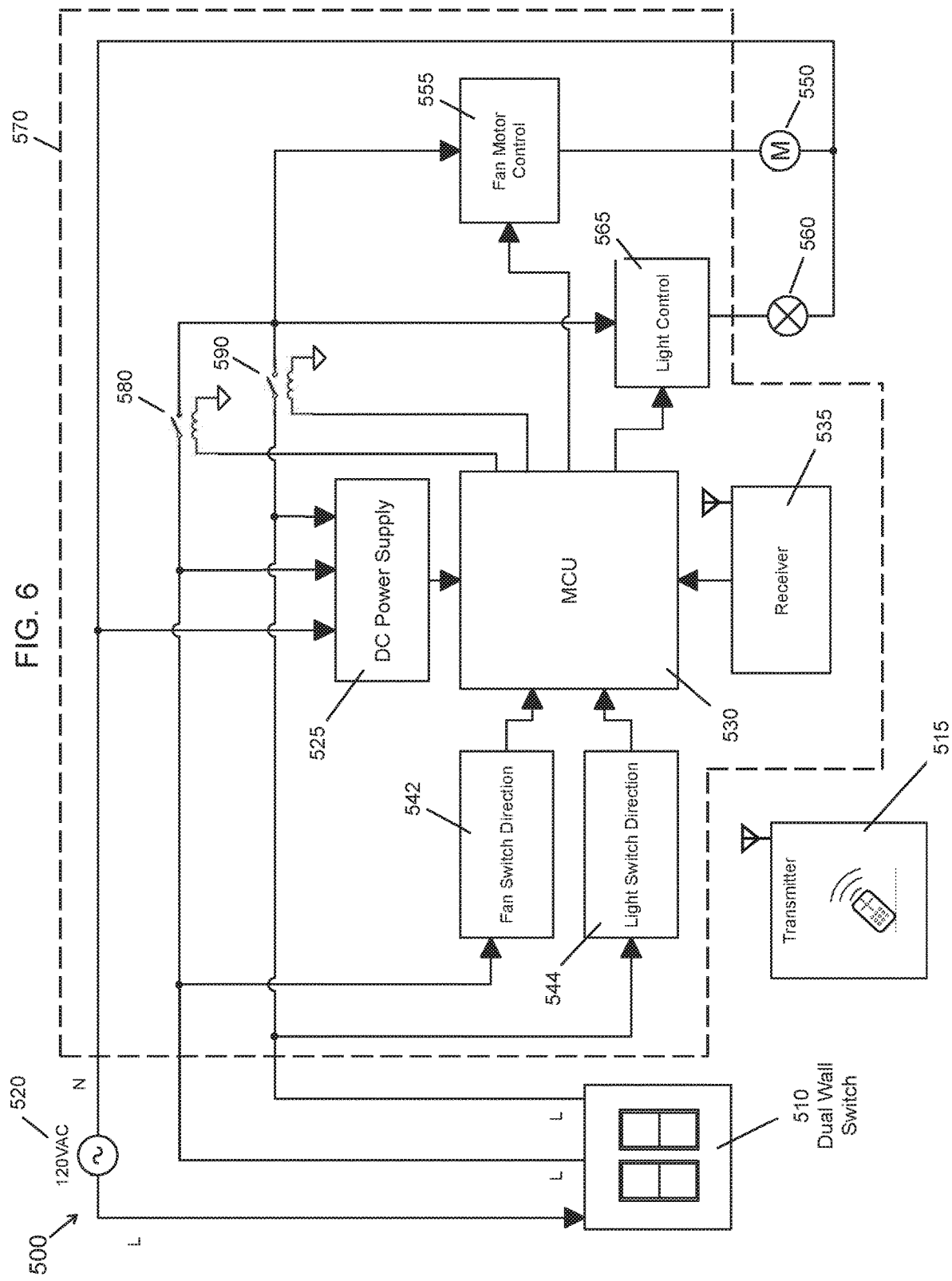
FIG. 6 is a second embodiment schematic of two wall switches controlling the ceiling fan and remote control of the invention where the fan switch or light switch can provide power to the ceiling fan and light kit, thus allowing either switch to be powered on for the novel invention to control the ceiling fan and light.

FIG. 6 is a schematic 500 of a second embodiment of this invention connected to a dual wall switch circuit 510.

In this embodiment, its operation is similar to FIG. 5, but the customer can turn on either the ceiling fan motor wall switch or the light wall switch to allow the remote control receiver 570 to provide power to the fan motor 550 and light 560. Relays 580 and 590 are closed according to which wall switch is powered on so that it can provide power to the fan motor and light. Only one relay may be closed at a time in order for the switch detection circuit to operate correctly. If both relays were closed, the switch detection circuits 542 and 544 could not detect the individual switch operation due to the feedback of the AC voltage through the closed circuit. For example, if the ceiling fan motor wall switch is powered on and the light wall switch is powered off, the MCU would close relay 580 (leaving relay 590 open) thereby providing power to the fan motor and light. In this case, if the light wall switch is controlled according to table 1 above, the light switch detection circuit 544 could detect the wall switch operation allowing the MCU to control the light accordingly. Additionally, the fan motor switch detection circuit 542 can operate effectively to control the fan according to table 2. Conversely, If the light wall switch is powered on and the fan motor wall switch is powered off, the MCU would close relay 590 (leaving 580 open) thereby providing power to the fan motor and light. If both the light wall switch and the fan motor wall switch are powered on the MCU will close only relay 580, thereby providing power to the fan motor and light and allowing the switch detection circuit 542 and 544 to work properly. In any of these 3 wall switch combinations, the customer can control the light and fan with the remote control transmitter or optionally using the wall switch control according to tables 1 and 2 above. If the schematic 500 is connected to a single wall switch as shown it FIG. 4 its operation would be as described in table 3 below.

Figure 7:
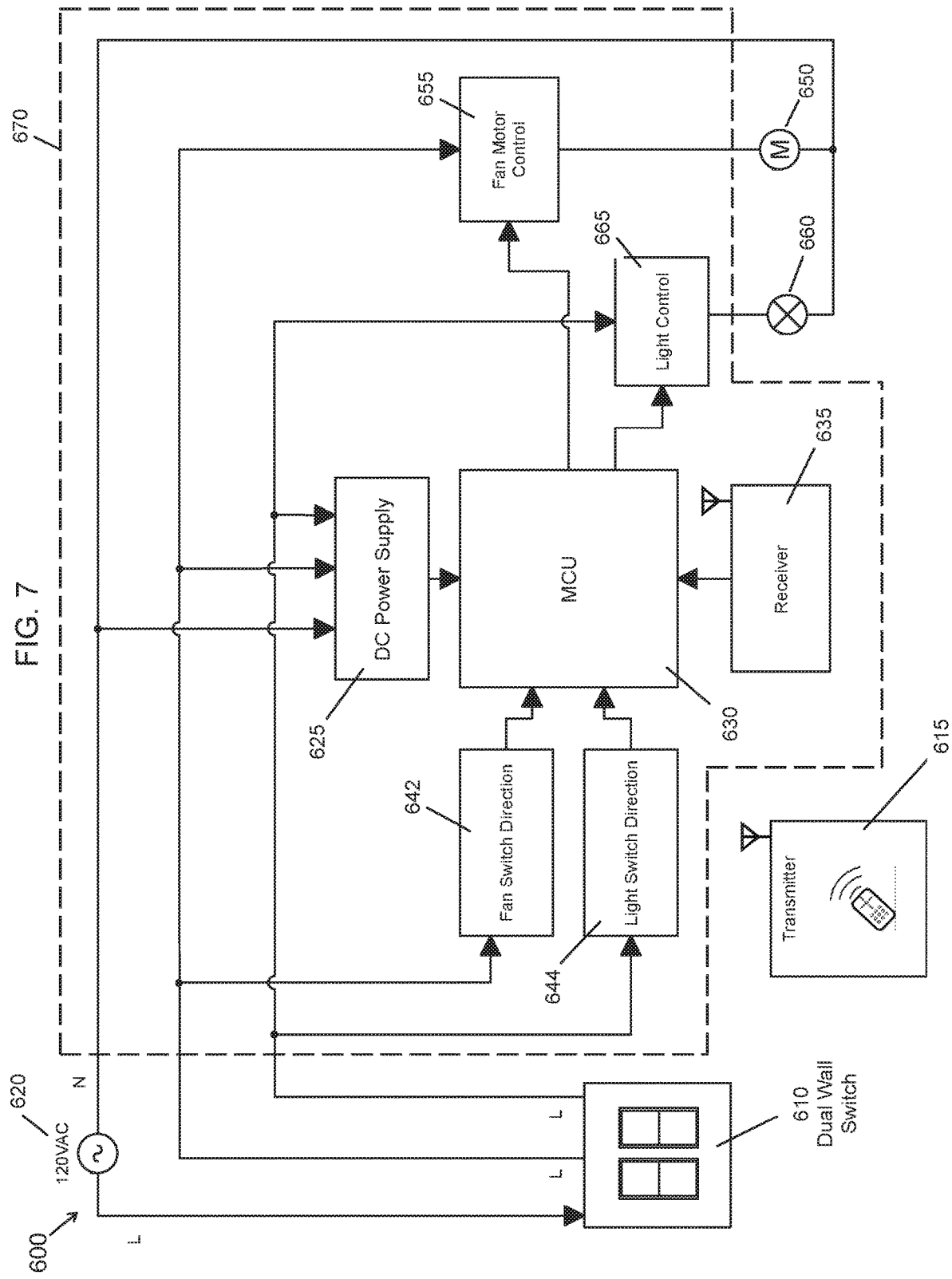
FIG. 7 is a third embodiment schematic of two wall switches controlling the ceiling fan and remote control of the invention where the fan switch or light switch can provide power to the remote control receiver and control the operation of the fan and light, but the fan switch must be powered on to provide power to the ceiling fan and the light switch must be powered on to provide power to the light kit.

FIG. 7 is a schematic 600 of a third embodiment of this invention connected to a dual wall switch circuit 610. In this embodiment, its operation is similar to FIG. 5 and FIG. 6, but the customer must turn on which ever wall switch in the dual switch 610 they intend to operate for the fan motor and light to have power and function correctly. If they want the fan motor to operate, they must have the fan motor wall switch powered on. If they want the light to operate, they must have the light wall switch in the dual switch 510 powered on. If they want both the fan motor and light to operate, both wall switches must be powered on. Once powered on, the remote control transmitter can control the fan motor and/or light independently as described previously. The light may be operated as described previously in FIG. 5 and table 1 and the fan motor may be operated as described previously in FIG. 5 and table 2. If the schematic 600 is connected to a single wall switch as shown it FIG. 4 its operation would be as described previously in FIG. 5. and table 3 below.

Figure 8:
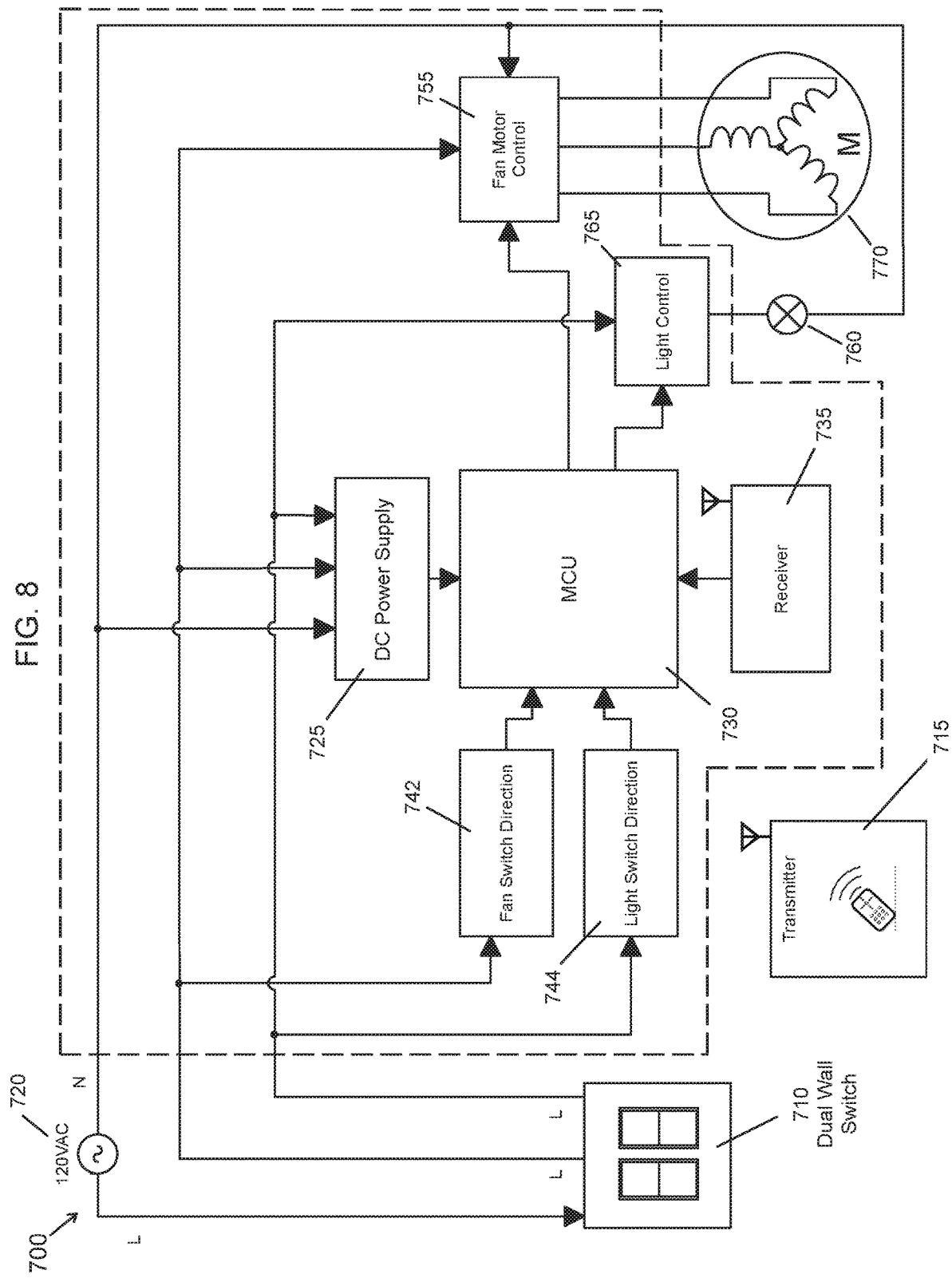
FIG. 8 is a fourth embodiment schematic similar to FIG. 7 but having a brushless DC motor powering the fan.

FIG. 8 is a schematic 700 of a fourth embodiment of this invention that the same as FIG. 7 but has a brushless DC motor powering the fan instead of an AC motor. The fan motor control 755 has 3 output wires that power the brushless DC motor 750. Each of the three output wires sequentially excite the coils to drive the DC motor 750.

This same brushless DC motor 750 and fan motor control 750 can be used in FIG. 5 and FIG. 6 to power a DC motor fan as well.

While the embodiments refer to a wall switch, the wall switch can include a single wall switch for controlling power to both the ceiling fan and the light. The wall switch can include two separate wall switches, with one switch controlling power to the light and the other switch controlling power to the fan. The wall switch can be a switch panel with one or more switches for controlling power to the light and/or the fan.

The invention can be used with other applications, such as but not limited to being used with a smart computer system that controls lights and ceiling fans I a home, and the like.

Additionally, the invention can be use with other applications, such as part of a smart phone for controlling the fans/and/or lights in any type of building.

The toggling action between turning the wall switch to an off position and back to an on position in the tables 1, 2 and 3 includes up to approximately 10 seconds between turning the switch off and back on. The toggling action can be used with one wall switch for controlling power to the light. The toggling action can be used with one wall switch for controlling power to the fan. The toggling action can be used with a single wall switch for controlling power to both the light and the ceiling fan.

The novel toggling action can also be used with a pull chain that is used to supply power to the light and/or the ceiling fan.

Tables 1, 2 and 3 can work with all the described embodiments.

The term "approximately"/"approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for controlling a ceiling fan light, comprising:
a ceiling fan with a light;
a remote control for controlling light to the ceiling fan;
a wall switch having an on and an off state, wherein the wall switch control will operate the ceiling fan light with or without the remote control, wherein with the wall switch in an on position, and the light is off, then toggling for switching the wall switch off and on will turn on the light, and wherein toggling includes up to approximately 10 seconds between turning the switch off and back on.

2. The system of claim 1, wherein with the wall switch in an off position, and the light is off, then switching the wall switch on will turn on the light.

3. The system of claim 1, wherein with the wall switch in an on position, and the light is on, then switching the wall switch off will turn off the light.

4. The system of claim 1, wherein the wall switch includes two switches with first switch for turning on power to the light, and a second switch for turning on power to the ceiling fan, wherein the first switch operates the light with or without the remote control, and wherein the second switch operates the ceiling fan with or without the remote control.

5. The system of claim 1, wherein the wall switch includes a single switch for controlling power to both the ceiling fan and the light.

6. The system of claim 1, further comprising:
a remote control receiver in the ceiling fan for receiving control signals from the remote control;
one junction box for passing through wires from the wall switch to the remote control receiver;
a single remote control receiver input neutral wire from the remote control receiver and passing through the one junction box to the remote control receiver;
a single remote control receiver input fan motor line wire from the one junction box and the remote control receiver; and
a single remote control receiver input light line wire between the one junction box and the remote control receiver.

7. A system for controlling a ceiling fan and light, comprising:
a ceiling fan having a light;
a remote control for controlling both the fan and the light; and
a wall switch having an on state and an off state, wherein the wall switch control will operate the ceiling fan light and the ceiling fan with or without the remote control, wherein with the fan and the light are both powered off and not running and the wall switch was in the on state, followed by switching the wall switch to an off position, and followed by toggling the wall switch to an on position, will provide power to both the fan and the light, and, wherein toggling includes up to approximately 10 seconds between turning the switch off and back on.

8. The system of claim 7, wherein with the fan and the light are both powered off and not running, and switching the wall switch to the on state will activate power to both the fan and the light to run at a last active setting for the both the fan and the light.

9. The system of claim 7, wherein with both the fan and the light are powered on and running, and switching the wall switch to the off state will turn off power to both the fan and the light.

10. The system of claim 7, wherein the wall switch includes:
a single switch for controlling power to both the ceiling fan and the light.

11. The system of claim 7, wherein the wall switch includes two switches with a first switch for turning on power to the light, and a second switch for turning on power to the ceiling fan, wherein the first switch operates the light with or without the remote control, and wherein the second switch operates the ceiling fan with or without the remote control.

12. The system of claim 7, further comprising:
- a remote control receiver in the ceiling fan for receiving control signals from the remote control;
- one junction box for passing through wires from the wall switch to the remote control receiver;
- a single remote control receiver input neutral wire from the remote control receiver and passing through the one junction box to the remote control receiver;
- a single remote control receiver input fan motor line wire from the one junction box and the remote control receiver; and
- a single remote control receiver input light line wire between the one junction box and the remote control receiver.

13. A system for controlling operation of a ceiling fan, comprising:
- a ceiling fan having a light;
- a remote control for controlling both the fan and the light; and
- a fan wall switch having an on and an off state, wherein the fan wall switch control will operate the ceiling fan with or without the remote, wherein with the fan wall switch being in an on position and the fan not being powered and not running, followed by turning the wall switch to an off position and toggling the wall switch to the on position will cause the fan to start running, and wherein toggling includes up to approximately 10 seconds between turning the switch off and back on.

14. The system of claim 13, wherein with the fan wall switch being in an off position with no power to the fan and the fan not running, and turning the fan wall switch to an on position, will cause the fan to run on a last speed set that the fan was powered to run on.

15. The system of claim 13, wherein with the fan wall switch being in an on position with the fan powered and running, and turning the wall switch to an off position will stop power to the fan and turn the fan off.

16. The system of claim 13, wall switch includes:
- a first wall switch for turning the power on and off to the fan; and
- a second wall switch for turning the power on and off to the light.

17. The system of claim 13, further comprising:
- a remote control receiver in the ceiling fan for receiving control signals from the remote control;
- one junction box for passing through wires from the wall switch to the remote control receiver;
- a single remote control receiver input neutral wire from the remote control receiver and passing through the one junction box to the remote control receiver;
- a single remote control receiver input fan motor line wire from the one junction box and the remote control receiver; and
- a single remote control receiver input light line wire between the one junction box and the remote control receiver.

* * * * *